US005249127A

United States Patent [19]

Komatsu

[11] Patent Number: 5,249,127

[45] Date of Patent: Sep. 28, 1993

[54] VEHICLE MOVEMENT DATA RECORDING AND ANALYZING SYSTEM AND RECORDING APPARATUS

[75] Inventor: Toshio Komatsu, Shizuoka, Japan

[73] Assignee: Yazaki Corporation, Tokyo, Japan

[21] Appl. No.: 668,834

[22] Filed: Mar. 13, 1991

[30] Foreign Application Priority Data

Mar. 14, 1990 [JP] Japan .................................. 2-61217

[51] Int. Cl.[5] .............................................. G06F 13/00

[52] U.S. Cl. ................................ 364/424.04; 364/550; 340/438

[58] Field of Search ...................... 346/33 R; 360/5, 6; 364/424.04, 424.01, 424.03, 431.01, 436, 442, 550, 551.01; 73/489, 490, 491, 117.3, 495, 510; 340/438, 439, 441, 459

[56] References Cited

U.S. PATENT DOCUMENTS

| | | | |
|---|---|---|---|
| 4,258,421 | 3/1981 | Juhasz et al. | 364/424.04 |
| 4,644,368 | 2/1987 | Mutz | 364/424.04 X |
| 4,757,454 | 7/1988 | Hisatake et al. | 364/424.03 X |
| 4,843,578 | 6/1989 | Wade | 364/424.01 X |
| 4,853,859 | 8/1989 | Morita et al. | 364/424.04 |
| 4,910,692 | 3/1990 | Outram et al. | 364/550 |
| 4,939,652 | 7/1990 | Steiner | 364/424.04 |
| 5,065,349 | 11/1991 | Thomas | 364/424.04 X |

*Primary Examiner*—Thomas G. Black
*Assistant Examiner*—Thomas S. Auchterlonie
*Attorney, Agent, or Firm*—Armstrong, Westerman, Hattori, McLeland & Naughton

[57] ABSTRACT

A vehicle movement data recording and analyzing system and a recording apparatus therefor can readily cope with variations of detailed specifications among users without modifying construction of the recording apparatus and also with an increase of specification items. The system includes a recording apparatus for compressing vehicle movement data in accordance with a predetermined set value and recording the data onto a record medium, and an analyzing apparatus for reading vehicle movement data from the record medium and expanding and analyzing the thus read vehicle movement data. The recording apparatus includes a reader for reading a predetermined set value from a record medium, a storage device for storing therein such predetermined set value, and a compressing device for compressing vehicle movement data in accordance with the predetermined set value and recording the vehicle movement data onto the record medium. The analyzing apparatus reads the vehicle movement data and the predetermined set value from the record medium and expand the thus read vehicle movement data in accordance with the predetermined set value.

4 Claims, 10 Drawing Sheets

VEHICLE MOVEMENT DATA RECORDING AND ANALYZING SYSTEM AND RECORDING APPARATUS

BACKGROUND OF THE INVENTION

1. Field of the Invention

This invention relates to a vehicle movement data recording and analyzing system for recording and collecting vehicle movement data indicative of moving conditions of a vehicle such as a speed and a travel distance onto a record medium and analyzing the thus collected vehicle movement data and also to a vehicle movement data recording apparatus for use with such vehicle movement data recording and analyzing system.

2. Description of the Prior Art

Vehicle movement data recording and analyzing systems of the type mentioned are conventionally known, and an exemplary one of such conventional recording and analyzing systems is shown in FIG. 10.

Referring to FIG. 10, the conventional recording and analyzing system shown includes a vehicle movement data recording apparatus 1 carried on a vehicle for compressing vehicle movement data indicative of moving conditions of the vehicle in accordance with a predetermined set value and recording the thus compressed vehicle movement data onto a record medium 2. The record analyzing system further includes a vehicle movement data analyzing apparatus 3 installed at an office for the supervision of movements of vehicles for reading compressed vehicle movement data from such record medium 2 and expanding and analyzing the thus read vehicle movement data.

Generally, in order to perform such recording and analysis as described above, predetermined set values must be set as specifications for an allowance (tolerance) in vehicle speed compression and a sampling time used on the recording side, a recording location of a record medium (whether an option is to be recorded or not and so forth), presence or absence of and a speed for a speed alarm, and so forth. Since, for example, the accuracy of vehicle movement data obtained by such compression processing as described above depends upon an allowance in vehicle speed compression and a sampling time as such predetermined set values as mentioned above, the set values must be varied when the accuracy of vehicle movement data desired by a user are different. A setting device 1*a* is thus provided for the vehicle movement data recording apparatus 1 so that various values may be set as the predetermined set values.

Since the set values are used also when the vehicle movement data analyzing apparatus 3 reads vehicle movement data recorded on the record medium 2 and expands the thus read vehicle movement data, the set values are also recorded on the record medium 2 together with compressed data.

The vehicle movement data recording apparatus 1 of the conventional system described above are shown more particularly in FIG. 11. Referring to FIG. 11, the vehicle movement data recording apparatus 1 is constituted from a microcomputer (CPU=central processing unit) 1*c*. The microcomputer 1*c* samples and receives an electric signal generated from a rotation sensor 11 connected to a transmission of the vehicle by suitable connecting means and having a period conforming to rotation of an axle of the vehicle and determines an instantaneous speed and a travel distance of the vehicle by calculation in accordance with the thus received electric signal. Then, in order to record the instantaneous speed and travel distance obtained by such calculation as digital data onto a record medium 2 loaded on a writer 1*b*, the microcomputer 1*c* further executes data compressing processing for decreasing the data length of the instantaneous speed and travel distance. Meanwhile, the setting device 1*a* is constituted from jumper lines or a dip switch connected to the CPU 1 so as to cope with a case wherein detailed specifications of any processing executed by the CPU 1 for such compressing processing as described above are different among different users. In FIG. 11, the setting device 1*a* is shown constituted from a setting device $1a_1$ for setting an allowance, another setting device $1a_2$ for setting a sampling time, and a further setting device $1a_3$ for setting an alarm speed.

Meanwhile, though not shown, the analyzing apparatus 3 is constituted from a personal computer (PC) and a reader-writer (RW) connected to the personal computer. If the record medium 2 is loaded into the reader-writer, then vehicle movement data recorded on the record medium 2 are read out by the reader-writer and transmitted to and stored into a memory in the personal computer. The data thus stored in the memory are expanded and analyzed in accordance with an analysis program and recorded onto a floppy disk (FD).

With the conventional system described above, since recording specifications which vary among various users are set by way of the setting device 1*a* connected to the CPU 1*c*, if setting items are increased in number, then the system may not cope with such increase of setting items because the CPU 1C has an only limited number of ports. Further, when it is desired to vary the specifications, the recording apparatus must be removed from the vehicle and disassembled. In this manner, an operation for varying the specifications is cumbersome.

SUMMARY OF THE INVENTION

It is an object of the present invention to provide a vehicle movement data recording and analyzing system which can readily cope with variations of detailed specifications among users without modifying construction of a recording apparatus thereof and also with an increase of specification items.

It is another object of the present invention to provide a vehicle movement data recording apparatus which can readily cope with variations of detailed specifications among users without modifying construction thereof and also with an increase of specification items.

In order to attain the objects, according to one aspect of the present invention, there is provided a vehicle movement data recording and analyzing system which comprises a vehicle movement data recording apparatus carried on a vehicle for compressing vehicle movement data indicative of moving conditions of the vehicle in accordance with a predetermined set value and recording the thus compressed vehicle movement data onto a record medium, and a vehicle movement data analyzing apparatus for reading vehicle movement data from the record medium and expanding and analyzing the thus read vehicle movement data, the vehicle movement data recording apparatus including reading means for reading a predetermined set value from the record medium, storage means for storing therein the predetermined set value read by the reading means, and compressing means for compressing vehicle movement data in accordance with the predetermined set value stored in the storage means and recording the thus compressed vehicle movement data onto a record medium, the vehicle movement data analyzing apparatus being constructed to read the vehicle movement data and the predetermined set value from the record medium and expand the thus read vehicle movement data in accordance with the predetermined set value read simultaneously with the vehicle movement data.

With the vehicle movement data recording and analyzing system, the vehicle movement data recording apparatus includes the reading means for reading a predetermined set value recorded in advance on a record medium, and the predetermined set value read by the reading means is stored into the storage means, and then the compressing means compresses vehicle movement data in accordance with the predetermined set value stored in the storage means and records the thus compressed vehicle movement data onto the record medium. Accordingly, such predetermined preset value need not be set onto the record medium by way of a special setting device in the vehicle movement data recording apparatus, and even if specification items to be recorded are increased in number or varied, the vehicle movement data recording and reproducing system can cope readily with such situation without modifying the construction thereof.

Preferably, the vehicle movement data analyzing apparatus of the vehicle movement data recording and analyzing system includes set value producing and recording means for producing a predetermined set value and recording the thus produced predetermined set value onto the record medium. Where the vehicle movement data analyzing apparatus includes the set value producing and recording means, an additional apparatus for recording a predetermined set value onto a record medium need not be provided separately.

According to another aspect of the present invention, there is provided a vehicle movement data recording apparatus carried on a vehicle for compressing vehicle movement data indicative of running conditions of the vehicle in accordance with a predetermined set value and recording the thus compressed vehicle movement data onto a record medium, which comprises reading means for reading a predetermined set value recorded in advance on a record medium, storage means for storing therein the predetermined set value read by the reading means, and compressing means for compressing vehicle movement data in accordance with the predetermined set value stored in the storage means and recording the thus compressed vehicle movement data onto the record medium.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
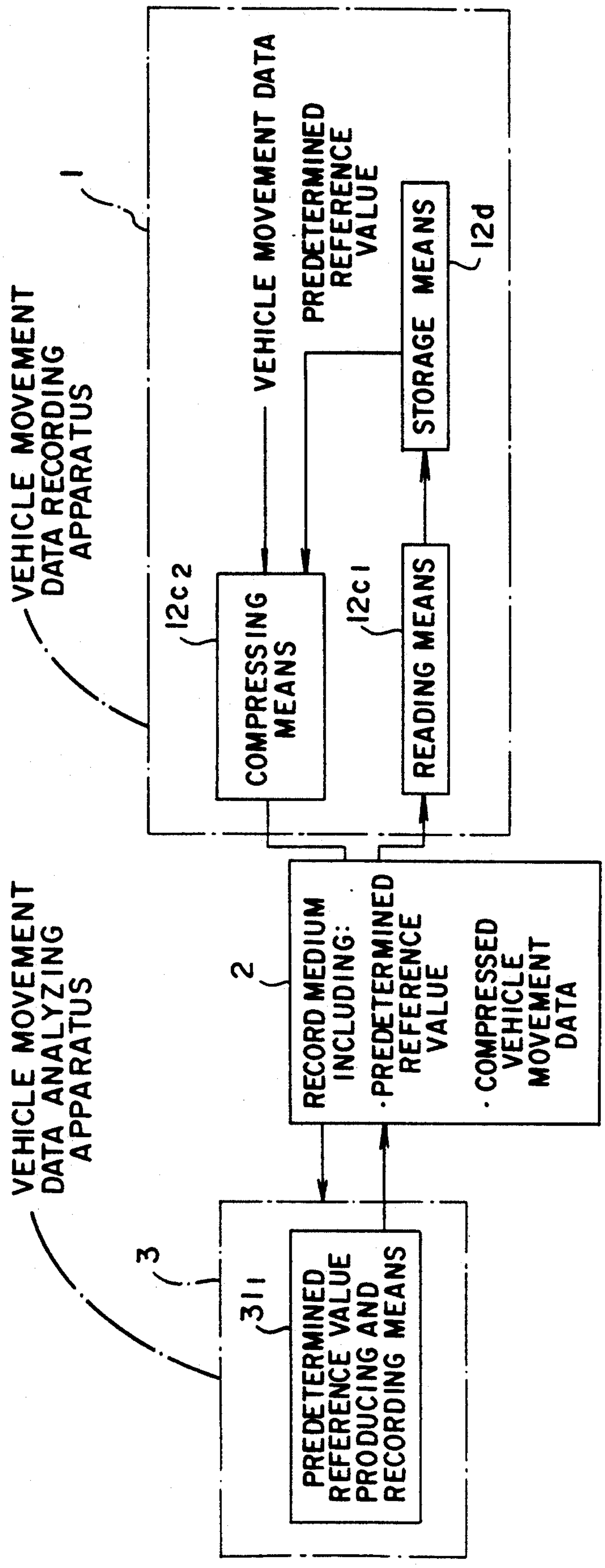
FIG. 1 is a block diagram showing basic construction of a vehicle movement data recording and analyzing system and a recording apparatus for use with such system according to the present invention.

Referring to FIG. 1, there is shown basic construction of a vehicle movement data recording and analyzing system according to the present invention. The vehicle movement data recording and analyzing system includes a vehicle movement data recording apparatus 1 carried on a vehicle not shown for compressing vehicle movement data indicative of moving conditions of the vehicle in accordance with a predetermined set value and recording the thus compressed movement data onto a record medium 2, and a vehicle movement data analyzing apparatus 3 for reading compressed vehicle movement data from such record medium 2 and expanding and analyzing the thus read vehicle movement data. The vehicle movement data recording apparatus 1 includes reading means $12c_1$ for reading a predetermined set value recorded on the record medium 2, storage means 12*d* for storing therein the predetermined set value read by the reading means $12c_1$, and compressing means $12c_2$ for compressing vehicle movement data in accordance with the predetermined set value stored in the storage means 12*d* and recording the thus compressed vehicle movement data onto the record medium 2. The vehicle movement data analyzing apparatus 3 reads such compressed vehicle movement data and the predetermined set value from the record medium 2 and expands the thus read vehicle movement data in accordance with the predetermined set value thus read simultaneously.

The vehicle movement data analyzing apparatus 3 includes set value producing and recording means $31_1$ for producing such preset value as described above and recording the thus produced predetermined set value onto the record medium 2.

With the vehicle movement data recording and analyzing system of the construction described above, the vehicle movement data recording apparatus 1 for compressing vehicle movement data indicative of moving conditions of the vehicle in accordance with a predetermined set value and recording the thus compressed vehicle movement data onto a record medium 2 includes the reading means 12$c_1$ for reading such predetermined set value recorded in advance on the record medium 2, and the predetermined set value read by the reading means 12$c_1$ is stored into the storage means 12*d*, and then the compressing means 12$c_2$ compresses vehicle movement data in accordance with the predetermined set value stored in the storage means 12*d* and records the thus compressed vehicle movement data onto the record medium 2. Accordingly, such predetermined preset value need not be set onto the record medium 2 by way of a special setting device in the vehicle movement data recording apparatus 1, and even if specification items to be recorded are increased in number or varied, the vehicle movement data recording and reproducing system can cope readily with such situation without modifying the construction of the vehicle movement data recording and reproducing system.

On the other hand, the vehicle movement data analyzing apparatus 3 for reading compressed vehicle movement data and a predetermined set value from a record medium 2 and expanding the thus read vehicle movement data in accordance with the predetermined set value thus read simultaneously includes the set value producing and recording means 31$_1$ for producing such predetermined set value and recording the thus produced predetermined set value onto the record medium 2. Accordingly, an apparatus for recording a predetermined set value onto such record medium 2 need not be provided separately.

Figure 2:
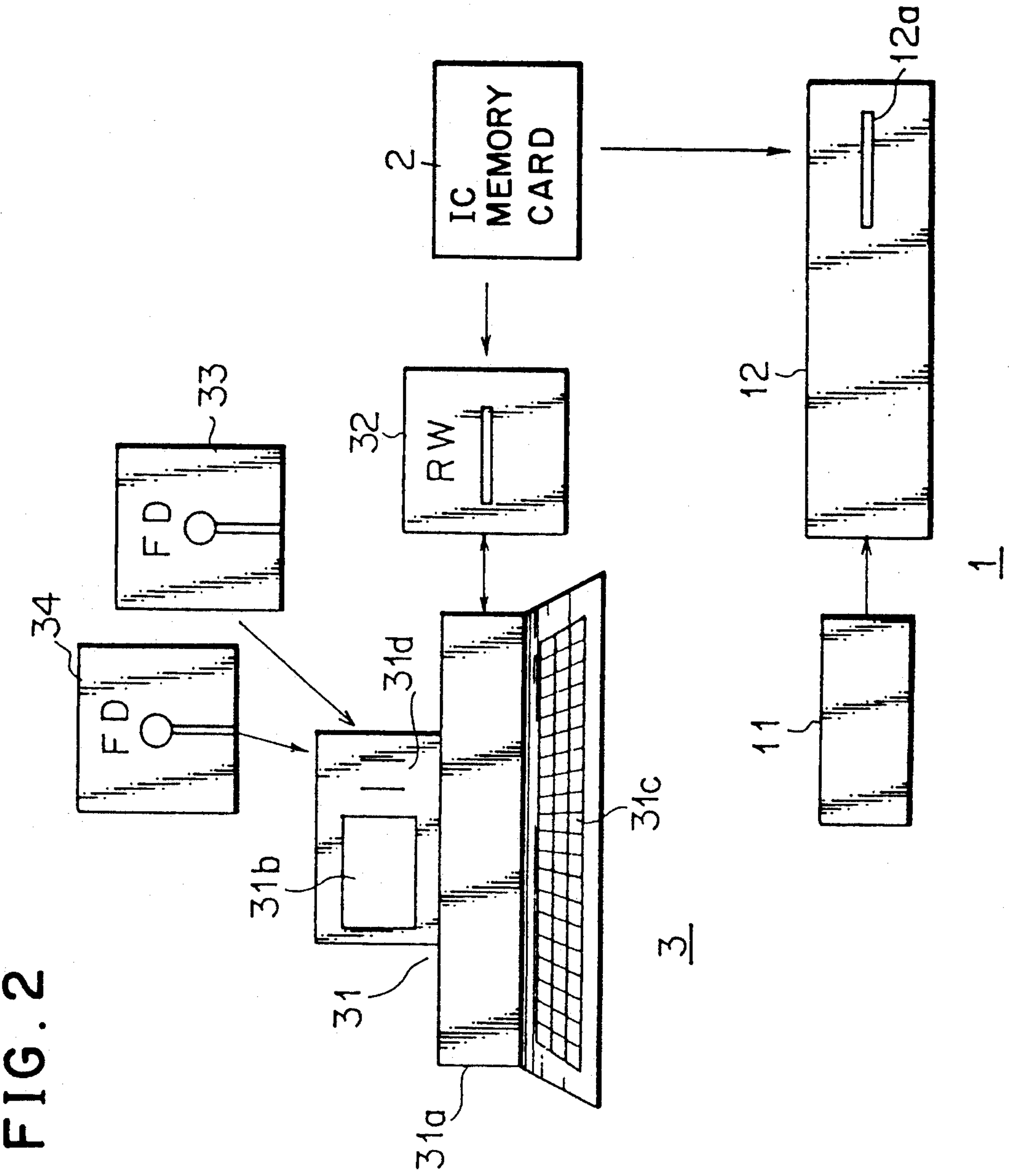
FIG. 2 is a diagrammatic representation of a vehicle movement data recording and analyzing system showing a preferred embodiment of the present invention.

Referring now to FIG. 2, there is shown a vehicle movement data recording and analyzing system according to the present invention. The conventional recording and analyzing system shown includes a vehicle movement data recording apparatus 1 carried on a vehicle (not shown) for compressing vehicle movement data indicative of moving conditions of the vehicle in accordance with a predetermined set value and recording the thus compressed vehicle movement data onto a record medium 2. The record analyzing system further includes a vehicle movement data analyzing apparatus 3 installed at an office for the supervision of movements of vehicles for reading compressed vehicle movement data from such record medium 2 and expanding and analyzing the thus read vehicle movement data.

The vehicle movement data recording apparatus 1 includes a rotation sensor 11 connected to a transmission (not shown) of the vehicle by way of suitable connecting means (not shown), and an apparatus body 12 for sampling and receiving an electric signal from the rotation sensor 11, determining an instantaneous speed and a travel distance of the vehicle by calculation and executing various jobs including compression of data in preparation for recording of the instantaneous speed and travel distance obtained by the calculation as digital data onto an IC (integrated circuit) memory card 2 serving as a record medium. The apparatus body 12 has a reader-writer (RW) 12*a* into and from which the IC memory card 2 is loaded and unloaded. When the IC memory card 2 is loaded in the reader-writer 12*a*, card setup data recorded on the IC memory card 2 are read out from the IC memory card 2 or such compressed data as described hereinabove are written into the IC memory card 2 by the reader-writer 12*a*.

On the other hand, the analyzing apparatus 3 includes a personal computer (PC) 31 which in turn includes a body 31*a*, a CRT (cathode ray tube) 31*b*, a keyboard 31*c*, a floppy disk (FD) driver 31*d* and so forth. The analyzing apparatus 3 further includes a reader-writer (RW) 32 connected to the body 31*a* of the personal computer 31. A pair of floppy disks 33 and 34 are removably loaded in the floppy disk driver 31*d* while the IC memory card 2 is removably loaded in the reader-writer 32.

Figure 3:
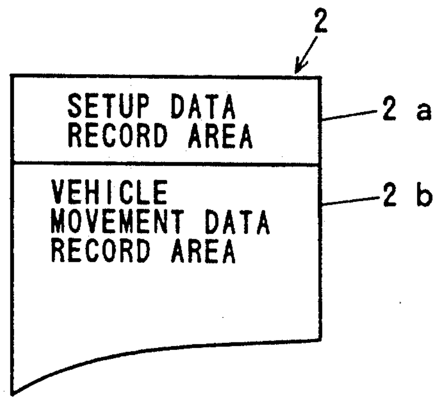
FIG. 3 is a schematic illustration showing record areas of an IC (integrated circuit) memory card for use with the recording and analyzing system shown in FIG. 2.

Referring now to FIG. 3, the IC memory card 2 has a setup data record area 2*a* for recording therein setup data consisting of various set values, and a vehicle movement data record area 2*b* for recording vehicle movement data therein. Meanwhile, referring back to FIG. 2, the floppy disk 33 to be loaded into the floppy disk driver 31*d* has stored in advance therein a data analyzing program, a setup program, and setup data which are set by execution of the setup program, and if the floppy disk 33 is loaded into the floppy disk driver 31*d*, then the data analyzing program, setup program and setup data are read by the floppy disk driver 31*d* and stored into a memory (not shown) in the apparatus body 31*a*.

If the IC memory card 2 is loaded into the reader-writer 32 to perform a reading operation, then the card setup data and compressed vehicle movement data recorded in the IC memory card 2 are read out and transmitted to the body 31*a* of the personal computer 31 and are temporarily stored into the memory in the apparatus body 31*a*. The data stored in the memory in the body 31*a* are analyzed in accordance with the analyzing program making use of the setup data or recorded into the floppy disk 34 for the data collection loaded in the floppy disk driver 31*d*. Once the floppy disk 34 on which vehicle movement data are recorded is loaded into the floppy disk driver 32*d*, the vehicle movement data stored therein to be analyzed are read into the memory in the body 31*a* so that they can thereafter be processed in accordance with the analyzing program or setup data of the floppy disk 33.

Figure 4:
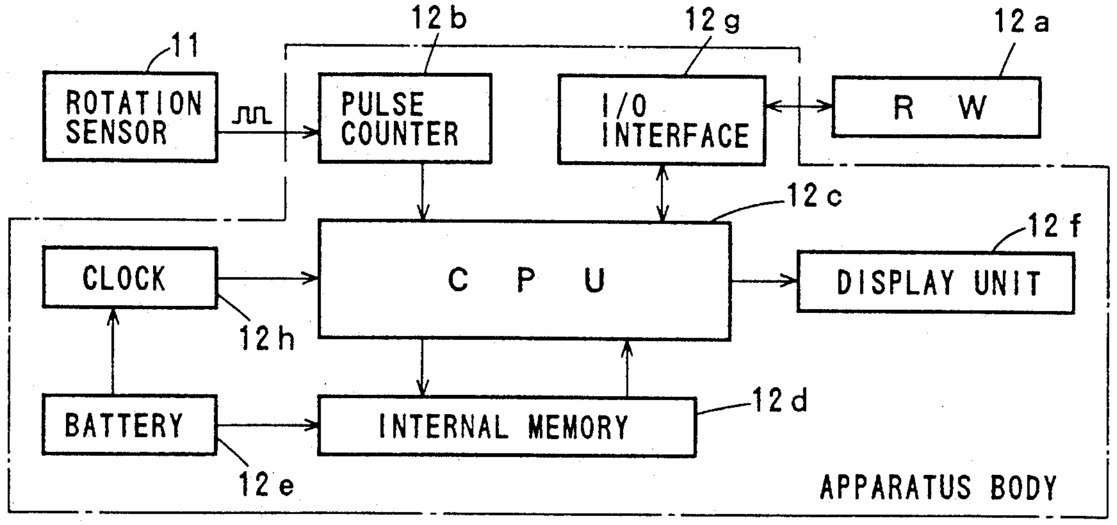
FIG. 4 is a block diagram showing construction of an apparatus body of a vehicle movement data recording apparatus of the recording and analyzing system of FIG. 2.

Referring now to FIG. 4, the apparatus body 12 of the vehicle movement data recording apparatus 1 includes a pulse counter 12*b*, a CPU 12*c*, an internal memory 12*d* including a ROM (read only memory) and a RAM (random access memory) not shown, a battery 12*e*, a display unit 12*f*, an input/output interface 12*g* and a clock 12*h* for producing data representative of real time. The reader-writer 12*a* is connected to the input/output interface 12*g*.

When the vehicle carrying the apparatus body 12 moves, the rotation sensor 11 produces a pulse signal, and such pulse signal is supplied to the pulse counter 12*b* in the apparatus body 12. The pulse counter 12*b* counts such pulse signal and stores therein a number of pulses inputted thereto, and after it counts up to its upper limit count value, it counts from zero again. The CPU 12*c* serves as a control unit for controlling all functions of the apparatus body 12 and is controlled in accordance with a control program stored in the ROM of the internal memory 12*d*. The CPU 12*c* monitors set values of a sampling time and an allowance (or permissible error range) stored in the RAM of the internal memory 12*d* and determines a period of a sampling timing signal in accordance with the set value of the sampling time.

It is to be noted that the set values (or predetermined reference values) are originally recorded in advance as setup data in the IC memory card 2 serving as a record medium, and when the IC memory card 2 is loaded into the reader-writer 12*a*, they are read out from the IC memory card 2 and stored into a predetermined area of the RAM in the internal memory 12*d*. The set values may include, in addition to such a sampling time and an allowance which are used in compression processing as mentioned hereinabove, an alarm speed for developing a speed alarm by way of a buzzer. The sampling time is selected from among 0.5, 1.0, 1.5 and 2.0 seconds; the allowance is selected from among ±1.0, ±1.5, ±2.0 and ±2.5 km/h; and the alarm speed is selected from between 1 km/h to 125 km/h.

The CPU 12 reads a value of the pulse counter 12*b* in response to a sampling timing signal, determines a number of input pulses for a sampling period from a difference of the value of the pulse counter 12*b* from a precedently read value of the pulse counter 12*b* stored in the internal memory 12*d*, and determines an instantaneous speed and a travel distance of the vehicle from the thus determined number of input pulses.

Figure 5:
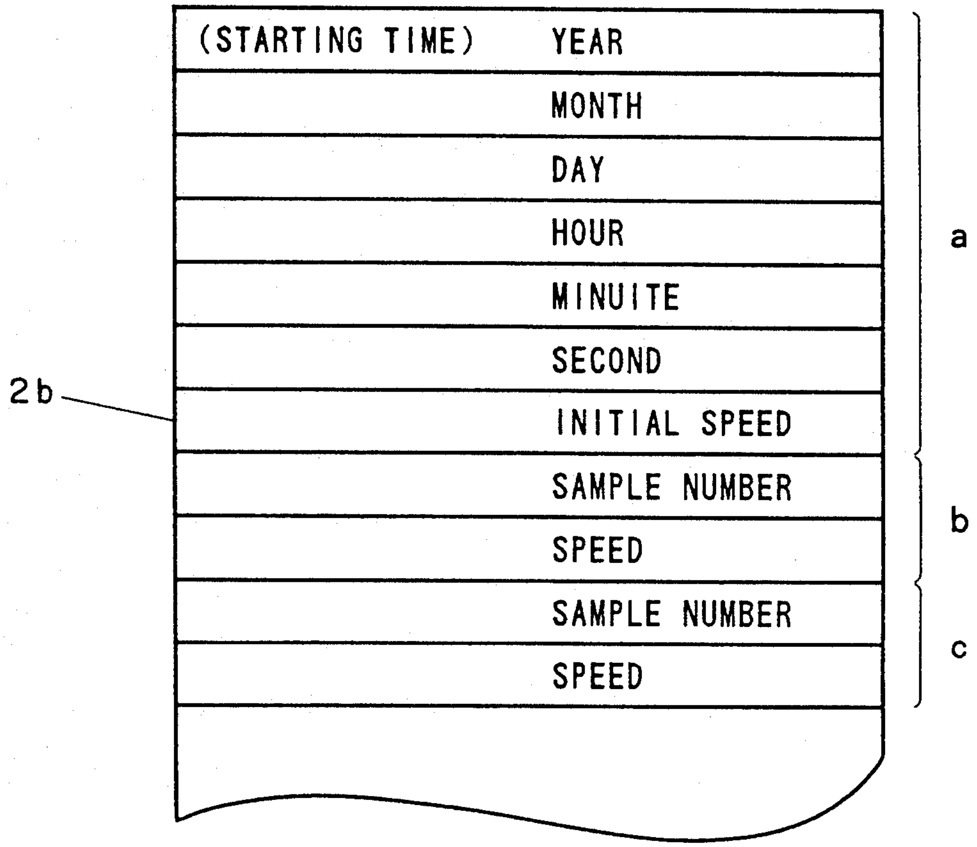
FIG. 5 is a schematic illustration showing vehicle movement data recorded in the IC memory card shown in FIG. 3.

If the data are the first data at starting of a movement of the vehicle, then the CPU 12*c* outputs the time information to the reader-writer 12*a* by way of the input-/output interface 12*g* to cause the reader-writer 12*a* to record the time information into the vehicle movement data record area 2*b* of the record medium 2. The time information includes, as seen in FIG. 5, data of a year, a month, a day, an hour, a minute, a second and an initial speed $V_0$. The initial speed $V_0$ then makes a starting point of a straight line to be thereafter produced by compression processing.

Compression processing of an instantaneous speed is executed based on the following idea. In particular, if a tolerance or allowance to be allowed for each sampled speed value is set in advance and a straight line intersecting the allowances is considered, then the straight line represents vehicle speed information within the allowance. Then, if the length of the straight line is represented by and recorded in a sampling number or number of samples and a value of a last end of the straight line is also recorded, then the vehicle speed for a period of time covered by the straight line can be supervised periodically. If the vehicle speed is stored only in length of the straight line and last point data in this manner, then much information can be stored in a small amount of data, and accordingly, compression of data is realized.

Figure 6:
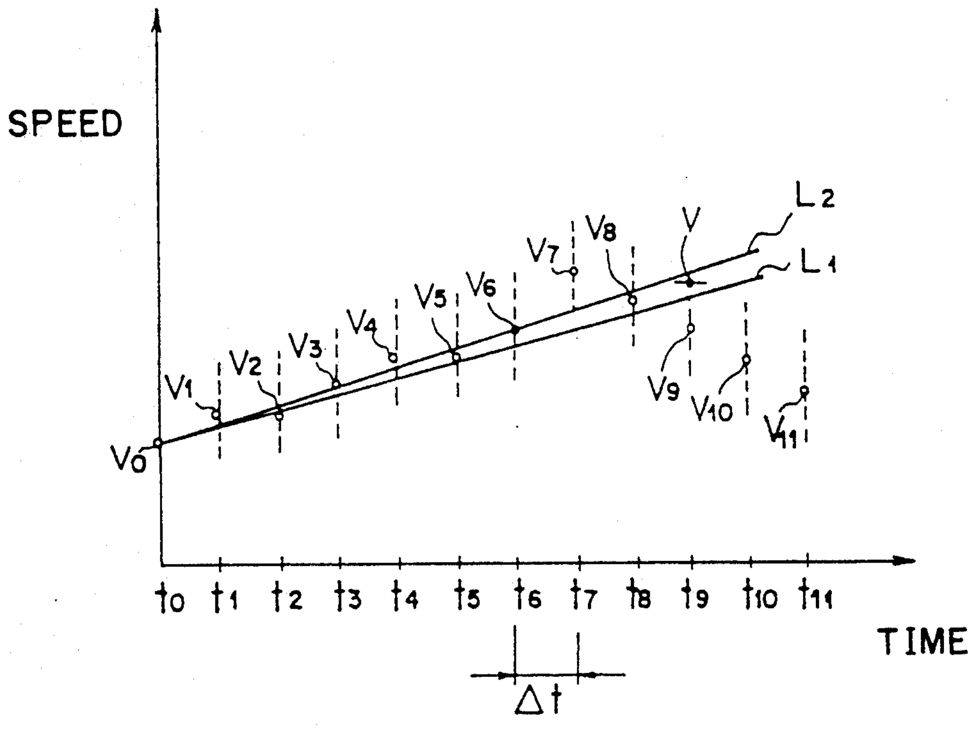
FIG. 6 is a diagram illustrating a manner of compression of vehicle movement data.

FIG. 6 illustrates a relationship among vehicle speeds $V_0$ to $V_{11}$ at sampling points of time $t_0$ to $t_{11}$, and each of broken lines in FIG. 6 represents an allowance of a vehicle speed. It is examined whether or not there exists, at each sampling point of time, a straight line which intersects the allowance of data at any preceding sampling point of time. While such straight line exists at the sampling points of time $t_0$ to $t_9$, no such straight line exists at the sampling point of time $t_{10}$. In this instance, among various straight lines which include the starting point $V_0$ and intersect an allowance, a straight line $L_2$ passing an upper limit and another straight line $L_1$ passing a lower limit are drawn, and a middle point V of that range of the allowance for the last sampling data $V_9$ which is defined by the straight lines $L_1$ and $L_2$ is determined as data of the last point and the length is determined to be "9". The last point is determined as a starting point of a next straight line, and similar operation is performed successively after that. By such compression processing as described above, compressed speed data are recorded in a sampling number and a speed into the IC memory card 2 as seen from ranges b and c in FIG. 5.

The IC memory card 2 into which vehicle movement data have been recorded by the reader-writer 12*a* of the vehicle movement data recording apparatus 1 is unloaded from the reader-writer 12*a* and then inserted into the reader-writer 32 of the analyzing apparatus 3 in order to make an analysis of the vehicle movement data in the IC memory card 2.

The analyzing apparatus 2 first reads, after the floppy disk 33 is loaded into and read by the floppy disk driver 31*d* and execution of the analyzing program stored in the floppy disk 33 is started, the setup data in the floppy disk 33, and stores the thus read setup data into the internal memory thereof, and then causes the CRT 31*b* to display a menu thereon. Such menu includes card initializing processing, ending processing, floppy disk reading processing and card reading processing. Thus, if the card initializing processing is selected, then part of the setup data are written, after initialization (writing of "FF" into a predetermined area) of an IC memory card 2 loaded in the reader-writer 32, into a predetermined area, that is, the setup data record area 2*a*, of the IC memory card 2. The thus initialized IC memory card 2 is then loaded, when the vehicle is to be moved, into the reader-writer 12*a* of the vehicle movement data recording apparatus 1 carried on the vehicle. In response to such loading of the IC memory card 2, the vehicle movement data recording apparatus 1 first reads the setup data from the IC memory card 2 and stores the thus read setup data into a predetermined area of the internal memory 12*d*, whereafter the vehicle movement data recording apparatus 1 executes necessary processing using the thus stored data.

Figure 7:
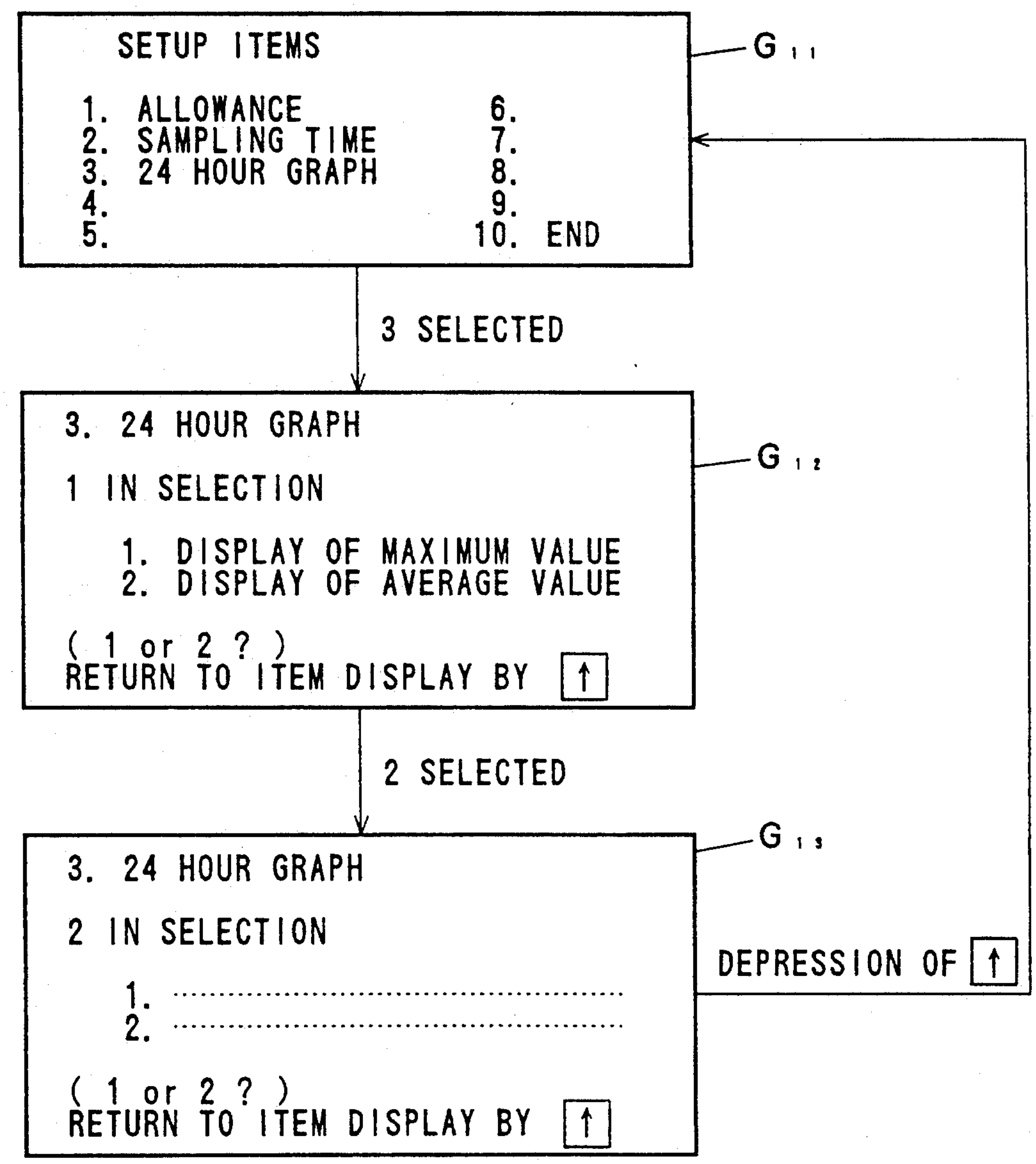
FIG. 7 is a flow diagram illustrating a setup program for a vehicle movement data analyzing apparatus of the recording and analyzing system of FIG. 2.

On the other hand, if the setup data producing processing is selected in prior to such card initializing processing, then the setup program is started so that setup data may be produced in accordance with such a procedure as, for example, seen in FIG.7. Referring to FIG. 7, such setup items as seen at $G_{11}$ are displayed on the CRT 31*b*. If an operator watches such display and selects, for example, the third item, then such a display as seen at $G_{12}$ is provided on the CRT 31*b* so that a display form in selection and modifiable items may be recognized by the operator. Now, if the operator selects the second item on the screen of the CRT 31*b*, such a display which informs of a thus modified new display form as seen at $G_{13}$ is provided on the screen of the CRT 31*b*.

While a manner of setting of setup data for the analysis by the vehicle movement data analyzing apparatus 3 is described hereinabove with reference to FIG. 7, if the allowance item or the sampling time item is selected with the screen of $G_{11}$, then confirmation of or modification to such set value can be performed. Then, those of the setup data produced by execution of such setup program which relate to recording onto an IC memory card are written into the IC memory card 2 upon initialization of the IC memory card 2 as described hereinabove.

It is to be noted that, when no specific setup data is required to be recorded in the IC memory card 2, predetermined standard specifications are set and processing is executed in accordance with such standard specifications. Meanwhile, if the standard specifications are made correspond to "1" in advance when setup data are to be written into the IC memory card 2, then even if no setup data exist in the floppy disk 33 and consequently can be written into the IC memory card 2 upon initialization, the value "1" is written into the setup data record area upon initialization, and consequently, processing in the standard specifications will be executed.

Subsequently, operation of the recording apparatus 1 and the analyzing apparatus 3 of the vehicle movement data recording and analyzing system will be described with reference to FIGS. 8 and 9, respectively.

Figure 8:
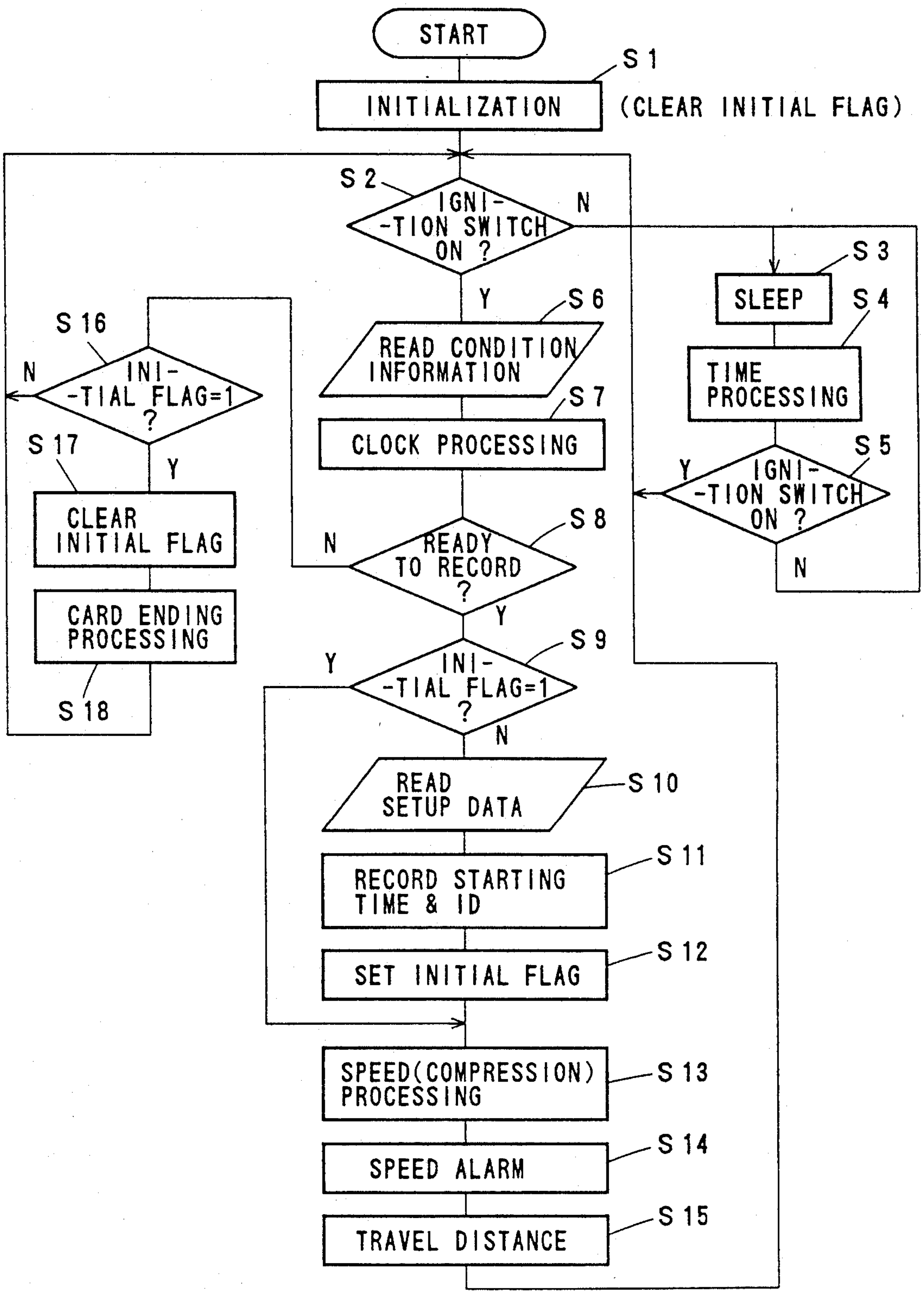
FIG. 8 is a flow chart illustrating operation of the vehicle movement data recording apparatus of FIG. 4.

Referring first to FIG. 8, there is shown a flow chart illustrating operation of the vehicle movement data recording apparatus 1 to be executed in accordance with the control program. The CPU 12*c* of the vehicle movement data recording apparatus 1 starts its operation when power is made available, and first at step S1, the CPU 12*c* executes its initialization to clear an initial flag which is assigned to a predetermined area in the RAM of the internal memory 12*d*. Subsequently, the control sequence advances to step S2 at which the CPU 12*c* judges in accordance with a signal from an ignition detecting circuit not shown of the vehicle whether or not an ignition switch not shown of the vehicle is switched on. If the ignition switch is off, then the CPU 12 puts itself into a sleeping condition at step S3, and then clock processing is executed at step S4. After then, at step S5, it is judged again whether or not the ignition switch is switched on, and the jobs at steps S3 to S5 are executed repetitively until the judgment of YES is obtained at step S5. After the judgment at step S5 becomes YES, the control sequence returns to step S2. In this instance, the control sequence advances from step S2 to step S6. At step S6, various information in accordance with which it is to be judged whether or not an IC memory card is ready to record is received from various sensors not shown. Then at step S7, clock processing is executed, and after then, the control sequence advances to step S8 at which it is judged in accordance with the information received at step S6 whether or not an IC memory card is ready to record.

If the judgment at step S8 is YES, then the control sequence advances to step S9 at which it is judged whether or not the initial flag is equal to 1. In case the judgment at step S9 is NO, the control sequence advances to step S10 at which setup data are read in from the IC memory card 2 and stored into the RAM of the internal memory 12*d*. Subsequently, the control sequence advances to step S11 at which a starting time and an ID (identifier) are written into a predetermined area of the IC memory card 2, and then to step S12 at which the initial flag is set to "1". After then, compression processing and recording of speed data are executed at step S13, and then speed alarm processing is executed at step S14, whereafter a travel distance is recorded into the IC memory card 2 at step S15. After then, the control sequence returns to step S2. Compression processing at step S13 is executed in accordance with a sampling time and an allowance in the setup data, and alarm processing at step S14 is executed in accordance with presence or absence of an alarm and an alarm speed in the setup data.

In case it is judged at step S8 that an IC memory card is not ready to record, the control sequence advances to step S16 at which it is judged whether or not the initial flag is equal to "1", and if the judgment here is NO, the control sequence returns to step S2. On the contrary, if the judgment at step S16 is YES, then the initial flag is cleared at step S17, and then the control sequence advances to step S18 at which ending processing of the IC card is executed, whereafter the control sequence returns to step S2.

Figure 9A:
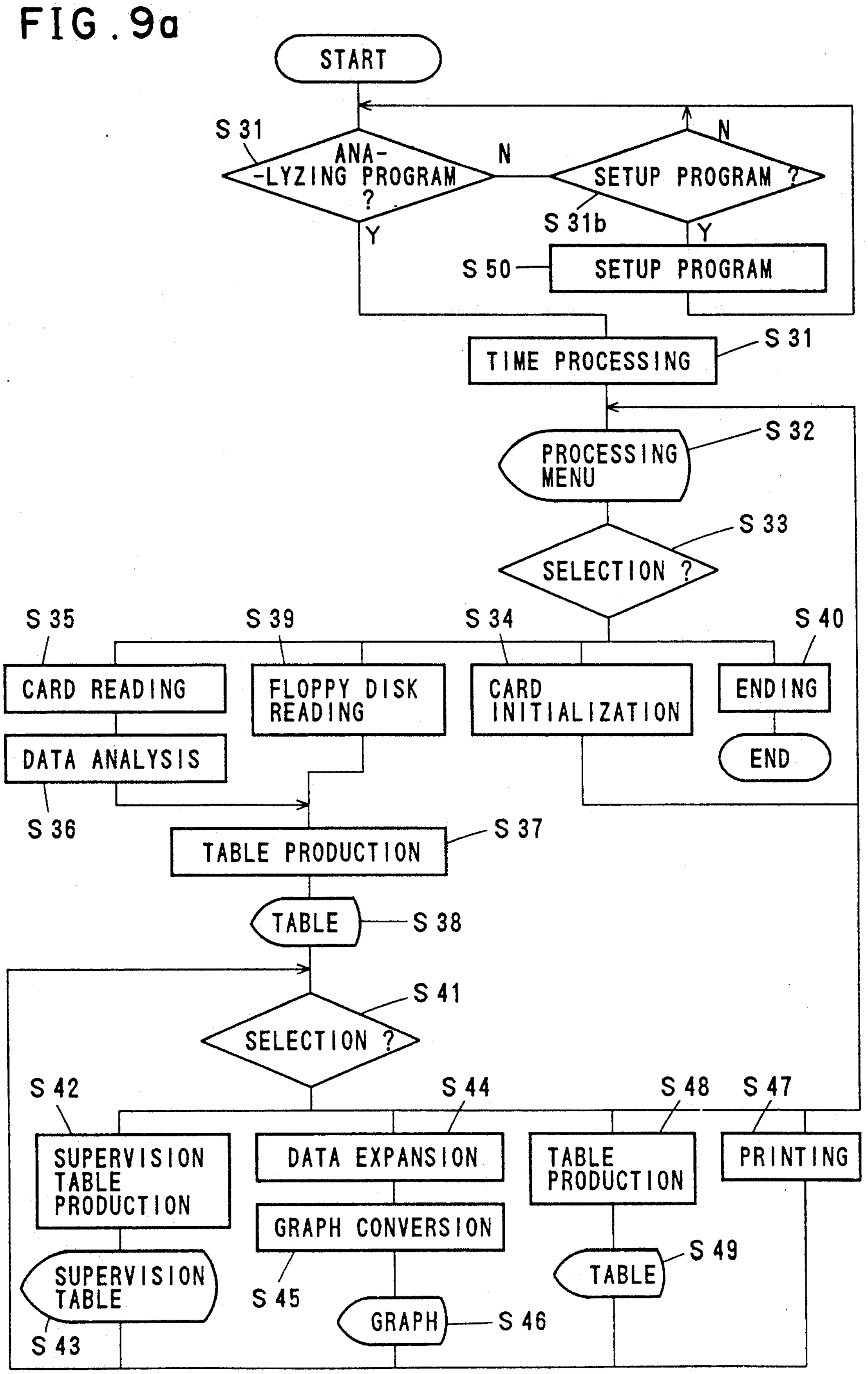
FIGS. 9*a* and 9*b* are flow charts illustrating operation of the vehicle movement data analyzing apparatus shown in FIG. 2.

Referring now to FIG. 9*a*, there is shown a flow chart illustrating operation of the vehicle movement data analyzing apparatus 3. The personal computer 31 of the vehicle movement data analyzing apparatus 3 starts its operation based on the MS-DOS system and judges at first step S31*a* whether or not the analyzing program is called by an input of a specific code. If the judgment is NO, the control sequence advances to step S31*b* at which it is judged whether or not the setup program is called by an input of another specific code. Thus, the personal computer 31 waits until either one of the specific codes is inputted and the judgment at step S31*a* or S31*b* changes to YES. If the judgment at step S31*a* changes to YES, then the control sequence advances to step S31 at which time processing is executed, and then to step S32 at which a processing menu is displayed on the CRT 31*b*. The personal computer 31 then waits, at step S33, a selecting operation which is performed by way of any of function keys of the keyboard 31*c* of the personal computer 31 by an operator watching the thus displayed menu. Then, if a function is selected by operation of a specific function key, then the thus selected processing is executed subsequently.

In particular, in case the card initializing processing is selected, the IC memory card 2 is initialized at step S34. In this instance, part of the setup data are written into a predetermined area of the IC memory card 2. Or, if the card reading processing is selected, then vehicle movement data and setup data are read in from the IC memory card 2 at step S35, and then at step S36, data storage processing is executed. After then, the control sequence advances to step S37 at which a table is produced and then to step S38 at which the table thus produced is displayed on the CRT 31*b*. On the other hand, if the floppy disk reading processing is selected at step S33, data are read in from the floppy disks 33 and 34 at step S39, and after then, the control sequence advances to step S37. Or otherwise, if the ending processing is selected at step S33, then predetermined processing for the ending of operation is executed at step S40, whereafter the personal computer 31 ends its operation.

After the table is displayed at step S38, the personal computer 31 waits, at step S41, a selecting operation by way of a function key of the keyboard 31*c* thereof which is performed by an operator watching the displayed table, and if a function is selected by a specific function key, then the thus selected processing will be executed. In particular, if supervision table producing processing is selected, then processing for the production of a supervision table, for example, a table of a frequency, a time and so forth in which an alarm speed is exceeded for an hour, is executed at step S42, and the thus produced supervision table is displayed on the CRT 31*b* at step S43, whereafter the control sequence returns to step S41.

On the other hand, if data expansion processing is selected, then data expansion processing is executed at step S44 in accordance with the setup data read in at step S35, and data obtained by such data expansion processing are converted into a graph at step S45. Then, the graph obtained by such conversion is displayed on the CRT 31*b* at step S46, whereafter the control sequence returns to step S41.

If otherwise printing processing is selected at step S41, then necessary printing is executed at step S47, whereafter the control sequence returns to step S41. Or else, if table producing processing is selected at step S41, then processing for the production of a table is executed at step S48, and the table thus produced is displayed on the CRT 31*b* at step S49, whereafter the control sequence returns to step S41. Besides, if a processing menu is selected by operation of the corresponding function key, then the control sequence returns to step S32 so that such selecting operation as described above may be performed again.

Figure 9B:
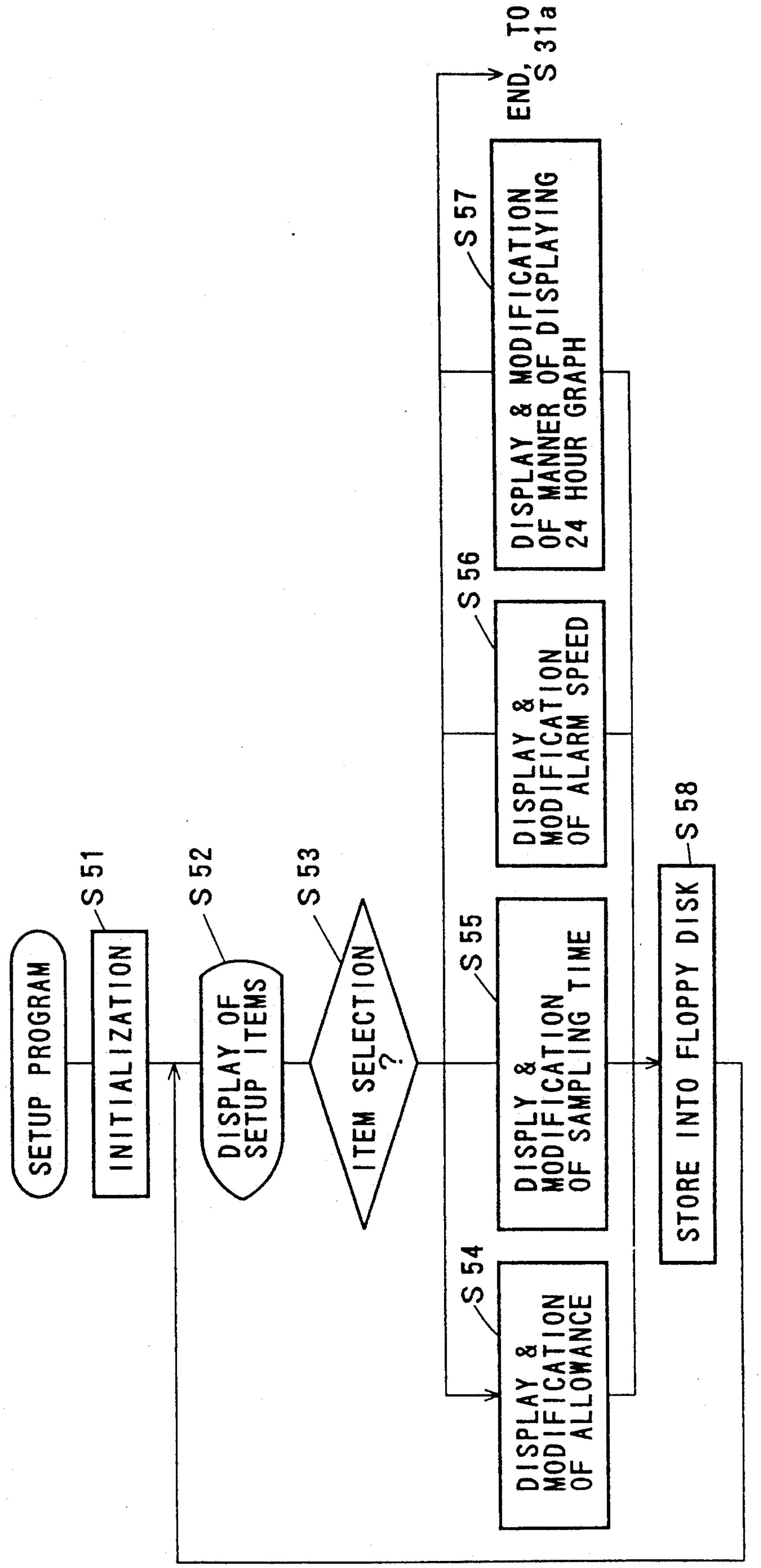
Figure 10:
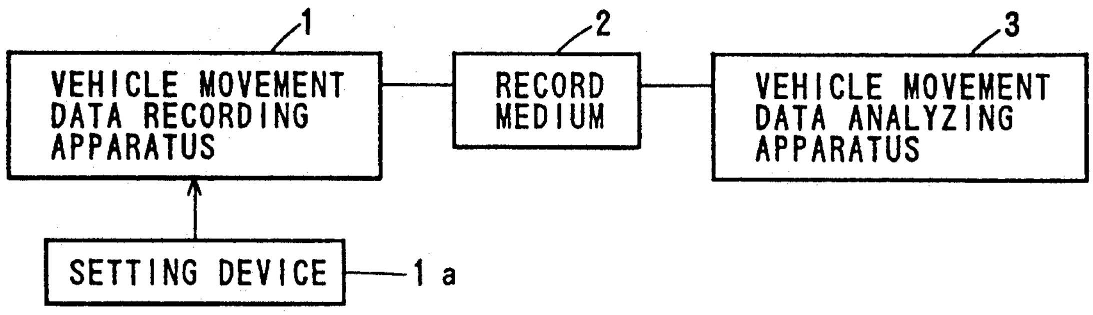
FIG. 10 PRIOR ART
FIG. 10 is a block diagram illustrating general construction of a conventional recording and analyzing system for vehicle movement data.
Figure 11:
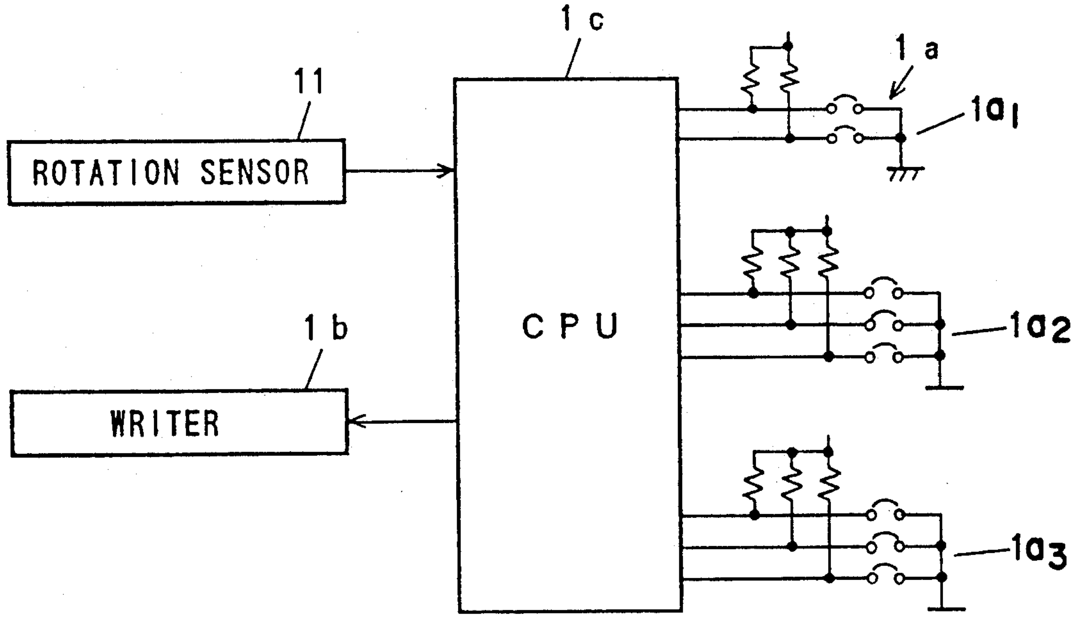
FIG. 11 PRIOR ART
FIG. 11 is a block diagram showing a conventional recording apparatus for use with the recording and analyzing system of FIG. 10.

It is to be noted that, in case the judgment at step S31*b* is YES, the control sequence advances to step S50 at which the setup program is executed. Details of such setup program is illustrated in FIG. 9*b*. Referring to FIG. 9*b*, after the setup program shown is started, initialization is executed first at step S51, and then at step S52, the setup items shown on the screen $G_{11}$ of FIG. 7 are displayed on the CRT 31*b*. The personal computer 31 then waits, at step S53, a selecting operation to be performed by an operator watching the thus displayed setup items. After such selecting operation to be performed by an operator watching the selected item is provided on the CRT 31*b* at a corresponding one of steps S54 to S57. Consequently, an operator, watching the thus displayed details, can perform a necessary operation such as setting of or modification to an item. It is to be noted that the steps S54 to S56 are provided to set or modify the setup data to be used with the vehicle movement data recording apparatus 1 while the step S57 is provided to set or modify the setup data to be used with the vehicle movement data analyzing apparatus 3. The thus set or modified setup data are stored into the floppy disk 33 or 34 at step S58, whereafter the control sequence returns to step S52 to make a display of the setup items on the CRT 31*b* again. If an ending item displayed together with the setup items on the CRT 31*b* is selected, then execution of the setup program is ended and the control sequence returns to step S31*a* shown in the flow chart of FIG. 9*a*.

Having now fully described the invention, it will be apparent to one of ordinary skill in the art that many changes and modifications can be made thereto without departing from the spirit and scope of the invention as set forth herein.

What is claimed is:

1. A vehicle movement data recording and analyzing system, comprising:

a vehicle movement data recording unit carried on a vehicle for compressing vehicle movement data indicative of moving conditions of said vehicle;

a record medium for storing a predetermined reference value and the thus compressed vehicle movement data; and a vehicle movement data analyzing unit for analyzing said compressed vehicle movement data, wherein said vehicle movement data recording unit includes, (a) reading means for reading said predetermined reference value from said record medium, (b) storage means for storing therein said predetermined reference value read by said reading means, and (c) compressing means for generating said compressed vehicle movement data in accordance with said predetermined reference value stored in said storage means and recording said compressed vehicle movement data onto said record medium, and wherein said vehicle movement data analyzing unit includes, (a) means for reading said compressed vehicle movement data and said predetermined reference value from said record medium, and (b) means for expanding and analyzing said compressed vehicle movement data in accordance with said predetermined reference value read simultaneously with said compressed vehicle movement data.

2. The vehicle movement data recording and analyzing system of claim 1, wherein said vehicle movement data analyzing unit further includes:

means for producing said reference value; and means for recording the thus produced reference value onto said record medium.

3. The vehicle movement data recording and analyzing system of claim 1, wherein said reference value comprises:

sampling points of time for sampling said vehicle speed data; and an allowance to be allowed for each of the thus sampled speed data.

4. The vehicle movement data recording and analyzing system of claim 1, wherein said record medium is an IC memory card, and said reading means is adapted to read said IC memory card.

* * * * *